(12) United States Patent
Jin et al.

(10) Patent No.: US 10,708,926 B2
(45) Date of Patent: Jul. 7, 2020

(54) BASE STATION CLUSTERING METHOD, BASE STATION CONTROL METHOD, AND APPARATUS

(71) Applicant: Huawei Technologies Co., Ltd., Shenzhen (CN)

(72) Inventors: Shi Jin, Nanjing (CN); Yaqi Zhao, Shenzhen (CN); Tianle Deng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 21 days.

(21) Appl. No.: 16/186,279

(22) Filed: Nov. 9, 2018

(65) Prior Publication Data

US 2019/0082442 A1 Mar. 14, 2019

Related U.S. Application Data

(63) Continuation of application No. PCT/CN2016/081730, filed on May 11, 2016.

(51) Int. Cl.
*H04W 72/08* (2009.01)
*H04W 52/02* (2009.01)
(Continued)

(52) U.S. Cl.
CPC ......... *H04W 72/085* (2013.01); *H04L 5/0048* (2013.01); *H04W 16/18* (2013.01);
(Continued)

(58) Field of Classification Search
CPC ........... H04W 72/085; H04W 52/0206; H04W 16/18; H04W 24/02; H04W 72/00;
(Continued)

(56) References Cited

U.S. PATENT DOCUMENTS 7,937,103 B1* 5/2011 Sigg ...................... H04W 52/28
455/522
8,812,049 B2* 8/2014 Brisebois ............ H04W 52/244
370/318
(Continued)

FOREIGN PATENT DOCUMENTS

CN 101604994 A 12/2009
CN 102006599 A 4/2011
(Continued)

OTHER PUBLICATIONS

Dressler, F., "Clustering" In "Self-Organization in Sensor and Actor Networks", XP055180067,John Wiley & Sons, Ltd, Chichester, UK, Nov. 2007, 17 pages.
(Continued)

*Primary Examiner* — Jay P Patel
(74) *Attorney, Agent, or Firm* — Slater Matsil, LLP (57) ABSTRACT

A base station clustering method, the method including a clustering server clustering base stations in a base station set managed by the clustering server, to obtain at least one cluster, determining a cluster with a quantity of base stations in the cluster being 1, determining a neighboring base station of the base station in the cluster, and adding, when the neighboring base station is a cluster-head base station, the base station as a cluster-member base station to a cluster to which the neighboring base station belongs, so that the separately clustered base station can be added to another cluster, and a cluster-head base station in the another cluster can control a working status of the base station.

20 Claims, 3 Drawing Sheets

(51) Int. Cl.
*H04W 72/00* (2009.01)
*H04W 24/02* (2009.01)
*H04W 16/18* (2009.01)
*H04L 5/00* (2006.01)
*H04W 72/04* (2009.01)
*H04W 88/08* (2009.01)

(52) U.S. Cl.
CPC .......... *H04W 24/02* (2013.01); *H04W 52/02* (2013.01); *H04W 52/0206* (2013.01); *H04W 72/00* (2013.01); *H04W 72/0473* (2013.01); *H04W 88/08* (2013.01); *Y02D 70/00* (2018.01)

(58) Field of Classification Search
CPC . H04W 52/02; H04W 72/0473; H04W 88/08; H04W 92/12; H04W 88/12; H04L 5/0048
See application file for complete search history.

(56) References Cited

U.S. PATENT DOCUMENTS

| | | | |
|---|---|---|---|
| 9,730,175 B2* | 8/2017 | Xu | H04W 56/00 |
| 2011/0124345 A1* | 5/2011 | Lee | H04W 72/1231 455/452.2 |
| 2014/0080499 A1* | 3/2014 | Brisebois | H04W 52/244 455/452.1 |
| 2014/0355524 A1* | 12/2014 | Li | H04W 4/38 370/328 |
| 2015/0223143 A1 | 8/2015 | Celebi et al. | |
| 2016/0309396 A1* | 10/2016 | Chai | H04W 48/12 |
| 2016/0373993 A1* | 12/2016 | Luo | H04W 8/18 |
| 2017/0150419 A1* | 5/2017 | Li | H04W 40/244 |
| 2019/0045431 A1* | 2/2019 | Shmukler | H04W 48/16 |

FOREIGN PATENT DOCUMENTS

| | | |
|---|---|---|
| CN | 102625320 A | 8/2012 |
| CN | 103338517 A | 10/2013 |
| CN | 104159313 A | 11/2014 |
| CN | 104519559 A | 4/2015 |
| CN | 105472711 A | 4/2016 |
| CN | 103493539 B | 10/2017 |
| WO | 2014074719 A2 | 5/2014 |
| WO | 2014107849 A1 | 7/2014 |

OTHER PUBLICATIONS

Zhou, X. et al., "Game-Theoretical Frequency Reuse Method for Complex Cognitive Femto-cell Network," 2013 International Conference on Communications and Networking in China (CHINACOM), 2013, 5 pages.

Zheng, W. et al., "Hybrid BS-Cooperative Power Management Scheme with Self-Organized Sleep Mode in Virtual Cell-Based Femto Networks," Research Article, Hindawi Publishing Corporation, International Journal of Distributed Sensor Networks, vol. 2012, Article ID 785418, 2012, 12 pages.

* cited by examiner

BASE STATION CLUSTERING METHOD, BASE STATION CONTROL METHOD, AND APPARATUS

CROSS-REFERENCE TO RELATED APPLICATIONS

This application is a continuation of International Application No. PCT/CN2016/081730, filed on May 11, 2016, the disclosure of which is hereby incorporated by reference in its entirety.

TECHNICAL FIELD

The present disclosure relates to the communications field, and in particular, to a base station clustering method, a base station control method, and an apparatus.

BACKGROUND

A clustering server clusters at least two base stations according to a preset rule, to obtain at least one cluster, and controls a working status of each base station in the cluster, to reduce energy consumption of the base station. The working status of the base station includes two types. One type is an enabled state, namely, a state in which the base station enables a communications service; and the other type is a standby state, namely, a state in which the base station disables the communications service.

A clustering-based base station control method provided in a related technology includes clustering, by a clustering server according to a preset rule, a base station set managed by the clustering server, where each cluster includes a cluster-member base station and one cluster-head base station, controlling a base station whose load is zero in each cluster to maintain in a standby state, and a sniffer in the cluster-head base station to maintain in an enabled state, where the sniffer is configured to detect a change in signal strength of an uplink signal of each cluster-member base station in the standby state in the cluster, when signal strength of an uplink signal received by a cluster-member base station exceeds a preset threshold, instructing, by the cluster-head base station, the cluster-member base station to enable the sniffer, detecting, by the cluster-member base station by using the sniffer, whether signal strength of an uplink signal received within a preset time is continuously greater than the preset threshold, and if the cluster-member base station detects, by using the sniffer, that the signal strength of the uplink signal received within the preset time is continuously greater than the preset threshold, switching, by the cluster-member base station, a working status from the standby state to the enabled state, or if the cluster-member base station detects, by using the sniffer, that the signal strength of the uplink signal received within the preset time is less than or equal to the preset threshold, continuing maintaining, by the cluster-member base station, in the standby state.

When the clustering server clusters the base station set, a large quantity of separate base stations cannot be clustered. Consequently, working statuses of these base stations cannot be controlled.

SUMMARY

To resolve a problem that when a clustering server clusters a base station set, a relatively large quantity of separate base stations remain, and working statuses of these base stations cannot be controlled, embodiments of the present disclosure provide a base station clustering method, a base station control method, and an apparatus. The technical solutions are as follows:

According to a first aspect, a base station clustering method is provided. The method is applied to a clustering server, and the method includes clustering base stations in a base station set managed by the clustering server, to obtain at least one cluster, determining a cluster with a quantity of base stations in the cluster being 1, determining a neighboring base station of the base station in the cluster, and adding, when the neighboring base station is a cluster-head base station, the base station as a cluster-member base station to a cluster to which the neighboring base station belongs. The neighboring base station is a base station with a distance that is less than a first threshold from the base station, or the neighboring base station is a base station that sends one or more pilot signals to the base station and that enables an average pilot power of the one or more pilot signals received by the base station to be greater than a second threshold.

A separately clustered base station obtained through clustering is clustered again, so that the separately clustered base station can be added to another cluster, and a cluster-head base station in the another cluster can control a working status of the base station, thereby resolving a problem that the clustering server cannot control the working status of the separate base station when clustering the base station set, and energy consumption of the base station cannot be reduced, and reducing the energy consumption of the separately clustered base station.

With reference to the first aspect, in a first implementation of the first aspect, the clustering base stations in a base station set managed by the clustering server, to obtain at least one cluster includes circularly performing the following blocks, until a quantity of the base stations in the base station set is zero receiving clustering information reported by each base station in the base station set, and determining a neighboring base station set of each base station based on the clustering information, determining a base station having a highest degree as a cluster-head base station, selecting a cluster-member base station from a neighboring base station set of the base station, and enabling the cluster-head base station and the cluster-member base station as a cluster, where the degree is a quantity of neighboring base stations included in the neighboring base station set of the base station, and deleting the cluster-head base station and the cluster-member base station from the base station set. The neighboring base station set includes at least one neighboring base station of the base station, and the clustering information is a distance between the base station and another base station, or the clustering information is an average pilot power calculated by the base station based on a pilot signal sent by another base station.

The neighboring base station set of the base station having the highest degree includes a largest quantity of neighboring base stations, and there is a high probability that a relatively large quantity of cluster-member base stations are selected from the neighboring base station set of the base station. Therefore, when the base station set is clustered based on a degree of a neighboring base station set, there is a high probability that a relatively small quantity of clusters are finally obtained. A smaller quantity of clusters indicates a smaller quantity of cluster-head base stations communicating with a cluster-member base station, thereby reducing channel resources occupied by the cluster-head base station.

With reference to the first implementation of the first aspect, in a second implementation of the first aspect, when the clustering information is a distance between the base station and another base station, the selecting a cluster-member base station from a neighboring base station set of the base station includes circularly performing the following blocks, until the quantity of base stations in the neighboring base station set of the cluster-head base station is zero obtaining a first distance between an $i^{th}$ base station in the neighboring base station set of the cluster-head base station and the cluster-head base station, where i is a positive integer, obtaining a second distance between each base station in a neighboring base station set of the $i^{th}$ base station and the $i^{th}$ base station, and when the first distance is less than or equal to each second distance, determining the $i^{th}$ base station as a cluster-member base station, and deleting the cluster-member base station from the neighboring base station set of the cluster-head base station, or when the first distance is greater than any second distance, deleting the $i^{th}$ base station from the neighboring base station set of the cluster-head base station.

When the clustering information is a distance between the base station and another base station, whether the distance between the cluster-head base station and the $i^{th}$ neighboring base station of the cluster-head base station is less than the distance between the $i^{th}$ base station and each neighboring base station of the $i^{th}$ base station is detected, so that the neighboring base station is added in priority to a cluster to which a cluster-head base station closest to the neighboring base station belongs, thereby shortening a communication distance between a cluster-head base station and a cluster-member base station in each cluster, and improving efficiency of communication between the cluster-head base station and the cluster-member base station.

With reference to the first implementation of the first aspect, in a third implementation of the first aspect, when the clustering information is an average pilot power calculated by the base station based on a pilot signal sent by another base station, the selecting a cluster-member base station from a neighboring base station set of the base station includes circularly performing the following blocks, until the quantity of base stations in the neighboring base station set of the cluster-head base station is zero obtaining a first average pilot power of one or more pilot signals sent by an $i^{th}$ base station in the neighboring base station set of the cluster-head base station to the cluster-head base station, where i is a positive integer, obtaining a second average pilot power of one or more pilot signals sent by each base station in a neighboring base station set of the $i^{th}$ base station to the $i^{th}$ base station, and when the first average pilot power is greater than or equal to each second average pilot power, determining the $i^{th}$ base station as a cluster-member base station, and deleting the cluster-member base station from the neighboring base station set of the cluster-head base station, or when the first average pilot power is less than any second average pilot power, deleting the $i^{th}$ base station from the neighboring base station set of the cluster-head base station.

When the clustering information is an average pilot power calculated by the base station based on a pilot signal sent by another base station, because the average pilot power of the one or more pilot signals sent by the $i^{th}$ base station to the cluster-head base station is in positive correlation with an average pilot power of one or more pilot signals sent by the cluster-head base station to the $i^{th}$ base station, whether the average pilot power of the one or more pilot signals sent by the $i^{th}$ base station to the cluster-head base station is greater than the average pilot power of the one or more pilot signals sent by each neighboring base station of the $i^{th}$ base station to the $i^{th}$ base station is detected, so that the neighboring base station is added in priority to a cluster to which a cluster-head base station having a high average pilot power belongs, thereby improving quality of a signal transmitted between a cluster-head base station and a cluster-member base station in each cluster, and improving efficiency of communication between the cluster-head base station and the cluster-member base station.

With reference to the first aspect, or the first implementation to the third implementation of the first aspect, in a fourth implementation of the first aspect, the determining a neighboring base station of the base station in the cluster includes receiving clustering information reported by each base station in the base station set, and determining a neighboring base station set of each base station based on the clustering information, where the neighboring base station set includes at least one neighboring base station of the base station, and determining, in a neighboring base station set of the base station in the cluster, a neighboring base station closest to the base station, or determining a neighboring base station that sends one or more pilot signals to the base station and that enables an average pilot power of the one or more pilot signals received by the base station to be the highest, and the adding, when the neighboring base station is a cluster-head base station, the base station as a cluster-member base station to a cluster to which the neighboring base station belongs includes when the neighboring base station closest to the base station is a cluster-head base station, or when the neighboring base station that sends the one or more pilot signals to the base station and that enables the average pilot power of the one or more pilot signals received by the base station to be the highest is a cluster-head base station, adding the base station as a cluster-member base station to a cluster to which the neighboring base station belongs.

When a neighboring base station closest to the separately clustered base station is a cluster-head base station, the base station as a cluster-member base station is added to a cluster to which the neighboring base station belongs, so that the working status of the base station can be controlled by using the neighboring base station, and a problem of low communication efficiency caused by an excessively long communication distance between the base station and the cluster-head base station can be avoided when the base station is added to another cluster, thereby improving efficiency of communication between the separately clustered base station and the cluster-head base station.

When a neighboring base station that sends one or more pilot signals to the separately clustered base station and that enables an average pilot power of the one or more pilot signals received by the separately clustered base station to be the highest is a cluster-head base station, the base station as a cluster-member base station is added to a cluster to which the neighboring base station belongs, so that the working status of the base station can be controlled by using the neighboring base station, and a problem of low communication efficiency caused by excessively poor quality of the pilot signal between the base station and the cluster-head base station can be avoided when the base station is added to another cluster, thereby improving efficiency of communication between the separately clustered base station and the cluster-head base station.

With reference to the first aspect, or the first implementation to the fourth implementation of the first aspect, in a fifth implementation of the first aspect, after the adding, when the neighboring base station is a cluster-head base station, the base station as a cluster-member base station to a cluster to which the neighboring base station belongs, the method further includes, for each cluster, sending a cluster-head identity and an address of each cluster-member base station to a cluster-head base station in the cluster, and sending, by the cluster-head base station, an address of the cluster-head base station and a cluster-member identity to each cluster-member base station, or for each cluster, sending a cluster-head identity and an address of each cluster-member base station to a cluster-head base station in the cluster, and sending a cluster-member identity and an address of the cluster-head base station to each cluster-member base station.

According to a second aspect, a base station control method is provided. The method is applied to a cluster-head base station obtained by performing clustering according to the base station clustering method according to the first aspect, or the first implementation to the fifth implementation of the first aspect, and the method includes initializing a working status of each base station in a cluster to an enabled state, determining a cluster-member base station whose energy efficiency is lower than a preset threshold in the cluster, and instructing the cluster-member base station to switch the working status to a standby state. The enabled state is a state in which the base station enables a communications service, and the standby state is a state in which the base station disables the communications service.

The cluster-member base station whose energy efficiency is lower than the preset threshold in the clustered is instructed to switch the working status to the standby state, so that the cluster-head base station can determine, without needing to be equipped with a sniffer, whether the cluster-member base station needs to be instructed to switch the working status to the standby state, thereby resolving a problem of an excessively complex structure of the cluster-head base station caused by that the cluster-head base station needs to configure the sniffer to detect an uplink signal of the cluster-member base station, and determines, based on signal strength of the uplink signal, whether the cluster-member base station needs to be instructed to switch the working status to the standby state, and simplifying the structure of the cluster-head base station.

With reference to the second aspect, in a first implementation of the second aspect, the instructing the cluster-member base station to switch the working status to a standby state includes instructing the cluster-member base station to transfer, to at least one base station in the cluster, all user equipments accessing the cluster-member base station, where energy efficiency of each of the at least one base station is higher than the energy efficiency of the cluster-member base station, and after all the user equipments accessing the cluster-member base station are successfully transferred, instructing the cluster-member base station to switch the working status to the standby state.

The cluster-member base station is instructed to transfer, to the at least one base station in the cluster, all the user equipments accessing the cluster-member base station, where the energy efficiency of each of the at least one base station is higher than the energy efficiency of the cluster-member base station, and after all the user equipments accessing the cluster-member base station are successfully transferred, the cluster-member base station is instructed to switch the working status to the standby state, so that after all the user equipments accessing the cluster-member base station whose energy efficiency is lower than the preset threshold are successfully transferred, the cluster-head base station instructs the cluster-member base station to switch the working status to the standby state, thereby avoiding a problem of an interruption of a communications service for these user equipments caused by that the cluster-member base station is instructed to switch the working status to the standby state when these user equipments fail to be transferred to a base station in another cluster, and ensuring that the communications service for these user equipments is not interrupted.

With reference to the first implementation of the second aspect, in a second implementation of the second aspect, before the instructing the cluster-member base station to transfer, to a base station in the cluster, all user equipments accessing the cluster-member base station, the method includes calculating first total energy efficiency of all the base stations in the cluster, and after the instructing the cluster-member base station to transfer, to a base station in the cluster, all user equipments accessing the cluster-member base station, and before the instructing the cluster-member base station to switch the working status to the standby state, the method includes calculating second total energy efficiency of one or more other base stations in the cluster, where the one or more other base stations are base stations other than the cluster-member base station from which the user equipment is transferred in the cluster, and when the second total energy efficiency is higher than or equal to the first total energy efficiency, instructing the cluster-member base station to switch the working status to the standby state.

The first total energy efficiency of all the base stations in the cluster is calculated, all the user equipments accessing the cluster-member base station are transferred to the base station in the cluster, where the energy efficiency of the base station is higher than the energy efficiency of the cluster-member base station, the second total energy efficiency of the one or more other base stations in the cluster is calculated, where the one or more other base stations are base stations other than the cluster-member base station from which the user equipment is transferred in the cluster, and when the second total energy efficiency is higher than or equal to the first total energy efficiency, the cluster-member base station is instructed to switch the working status to the standby state, so that when all the user equipments accessing the cluster-member base station whose energy efficiency is lower than the preset threshold are successfully transferred, and total energy efficiency in the cluster after the transferring is improved, the cluster-head base station instructs the cluster-member base station to switch the working status to the standby state, thereby ensuring that the communications service for these user equipments is not interrupted, and improving total energy efficiency of the base station in the cluster.

With reference to the second aspect, in a third implementation of the second aspect, after the initializing a working status of each base station in a cluster to an enabled state, and before the determining a cluster-member base station whose energy efficiency is lower than a preset threshold in the cluster, the method further includes detecting whether a quantity of cluster-member base stations in a cluster to which the cluster-head base station belongs is zero, and when the quantity of cluster-member base stations is not zero, triggering execution of determining a cluster-member base station whose energy efficiency is lower than a preset threshold in the cluster, or when the quantity of cluster-member base stations is zero, detecting whether a quantity of user equipments accessing the cluster-head base station is zero, and if the quantity of user equipments is not zero, maintaining the working status of the cluster-head base station being the enabled state, or if the quantity of user equipments is zero, detecting whether an access request sent by user equipment is received within preset duration, and if the access request is received within the preset duration, maintaining the working status of the cluster-head base station being the enabled state, or if the access request is not received within the preset duration, switching the working status of the cluster-head base station to the standby state.

Whether the quantity of user equipments accessing the cluster-head base station is zero is detected, and when the quantity of user equipments is zero, the cluster-head base station is instructed to switch the working status to the standby state, so that a working status of a separately clustered base station can be switched based on a quantity of user equipments accessing the separately clustered base station, thereby reducing energy consumption of the separately clustered base station.

With reference to the second aspect, or the first implementation to the third implementation of the second aspect, in a fourth implementation of the second aspect, before the initializing a working status of each base station in a cluster to an enabled state, the method further includes at a start moment of each time period, triggering execution of initializing a working status of each base station in a cluster to an enabled state, where the time period is a time period obtained by dividing each duty cycle.

At the start moment of each time period, the cluster-member base station whose energy efficiency is lower than the preset threshold in the cluster is determined, so that the cluster-head base station can dynamically control the cluster-member base station, and when the cluster-member base station does not satisfy a condition for switching the working status to the standby state, the working status of the cluster-member base station can be adjusted at a start moment of a next time period, thereby improving flexibility of controlling the working status of the cluster-member base station by the cluster-head base station.

According to a third aspect, a base station clustering apparatus is provided. The apparatus is applied to a clustering server, and the apparatus includes at least one unit, where the at least one unit is configured to implement the base station clustering method according to the first aspect or at least one of the implementations of the first aspect.

According to a fourth aspect, a base station control apparatus is provided. The apparatus is applied to a cluster-head base station obtained by performing clustering according to the base station clustering method according to any one of the first aspect or the implementations of the first aspect, and the apparatus includes at least one unit, where the at least one unit is configured to implement the base station control method according to the second aspect or at least one of the implementations of the second aspect.

According to a fifth aspect, a clustering server is provided. The apparatus includes a processor and a transceiver connected to the processor, where the transceiver is configured to be controlled by the processor, and the processor is configured to implement the base station clustering method according to the first aspect or at least one of the implementations of the first aspect.

According to a sixth aspect, a cluster-head base station is provided. The cluster-head base station is obtained by performing clustering according to the base station clustering method according to any one of the first aspect or the implementations of the first aspect, and the apparatus includes a processor and a transceiver connected to the processor, where the transceiver is configured to be controlled by the processor, and the processor is configured to implement the base station control method according to the second aspect or at least one of the implementations of the second aspect.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DETAILED DESCRIPTION OF ILLUSTRATIVE EMBODIMENTS

To make the objectives, technical solutions, and advantages of the present disclosure clearer, the following further describes the implementations of the present disclosure in detail with reference to the accompanying drawings.

A "unit" mentioned in this specification is a functional structure divided based on logic, and the "unit" may be implemented by only hardware, or implemented by a combination of software and hardware.

Figure 1:
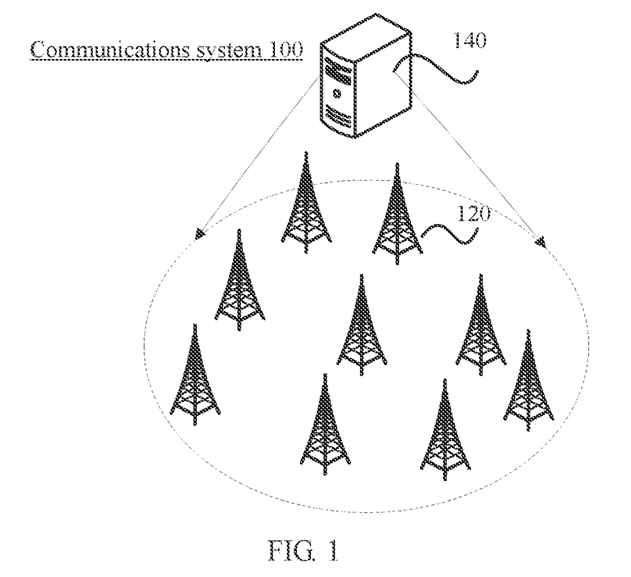
FIG. 1 is a schematic structural diagram of a communications system according to an embodiment of the present disclosure.

FIG. 1 is a schematic structural diagram of a communications system 100 according to an example of an embodiment of the present disclosure. The communications system 100 includes a plurality of base stations 120 and a clustering server 140.

In a densely populated place such as a shopping mall or a station, the base stations 120 are densely deployed, to form a base station set. For each base station 120 in the base station set, there is at least one neighboring base station. When a plurality of user equipments access the base station 120, there is a relatively large quantity of service traffic of the base station 120. When only few user equipments access the base station 120, there is a relatively small quantity of service traffic of the base station 120.

The base station 120 may be a NodeB or an evolved NodeB (eNB).

The clustering server 140 is configured to cluster the plurality of managed base stations 120, and the clustering server may be a self optimization network (SON) server.

Figure 2A:
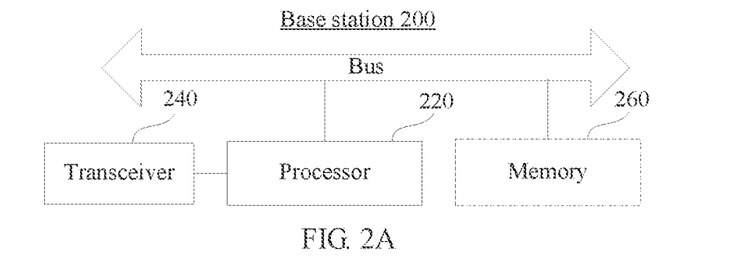
FIG. 2A is a schematic structural diagram of a base station according to an embodiment of the present disclosure.

FIG. 2A is a schematic structural diagram of a base station 200 shown in an example of an embodiment of the present disclosure. The base station 200 may be the base station 120 shown in FIG. 1, and the base station 200 includes a processor 220 and a transceiver 240 connected to the processor 220.

The transceiver 240 may include one or more antennas, and the antenna enables the base station 200 to send or receive a radio signal.

The transceiver 240 may be connected to the processor 220. The processor 220 is a control center of the base station, and the processor 220 may be a central processing unit (CPU), a network processor (NP), or a combination of a CPU and an NP. The processor 220 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

A memory 260 is connected to the processor 220 by using a bus or in another manner. The memory 260 may be a volatile memory, a non-volatile memory, or a combination thereof. The volatile memory may be a random access memory, for example, a static random access memory or a dynamic random access memory (DRAM). The non-volatile memory may be a read-only memory (ROM), for example, a programmable read-only memory (PROM), an erasable programmable read-only memory (EPROM), or an electrically erasable programmable read-only memory (EEPROM). The non-volatile memory may alternatively be a flash memory or a magnetic memory, for example, a magnetic tape, a floppy disk, or a hard disk. The non-volatile memory may alternatively be an optical disc.

When the base station 200 is a cluster-head base station, the memory 260 may store a total user rate or a power of a cluster-member base station in a cluster to which the base station 200 belongs. The total user rate or the power is reported by the cluster-member base station. The total user rate is a total rate of user equipment accessing the cluster-member base station.

Figure 2B:
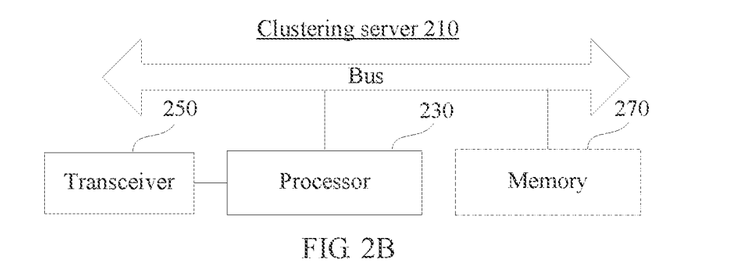
FIG. 2B is a schematic structural diagram of a clustering server according to an embodiment of the present disclosure.

FIG. 2B is a schematic structural diagram of a clustering server 210 shown in an example of an embodiment of the present disclosure. The clustering server 210 may be the clustering server 140 shown in FIG. 1, and the clustering server 210 includes a processor 230 and a transceiver 250 connected to the processor 230.

The radio transceiver 250 may include one or more antennas, and the antenna enables the base station 200 to send or receive a radio signal.

The transceiver 250 may be connected to the processor 230. The processor 230 is a control center of the base station, and the processor 230 may be a central processing unit (CPU), a network processor (NP), or a combination of a CPU and an NP. The processor 230 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

A memory 270 is connected to the processor 230 by using a bus or in another manner. The memory 270 may be a volatile memory, a non-volatile memory, or a combination thereof. The volatile memory may be a random access memory (RAM), for example, a static random access memory (SRAM) or a dynamic random access memory (DRAM). The non-volatile memory may be a read-only memory (ROM), for example, a programmable read-only memory (PROM), an erasable programmable read-only memory (EPROM), or an electrically erasable programmable read-only memory (EEPROM). The non-volatile memory may alternatively be a flash memory or a magnetic memory, for example, a magnetic tape, a floppy disk, or a hard disk. The non-volatile memory may alternatively be an optical disc.

The memory 270 may store clustering information reported by each base station in a base station set. The clustering information is a distance between each base station and another base station in the base station set, or the clustering information is an average pilot power calculated by each base station based on a pilot signal sent by another base station in the base station set.

Figure 3:
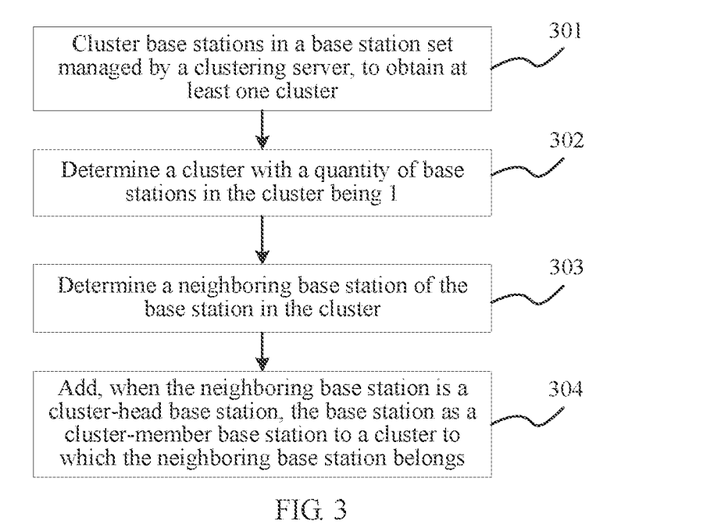
FIG. 3 is a method flowchart of a base station clustering method according to an embodiment of the present disclosure.

FIG. 3 is a flowchart of a base station clustering method according to an example of an embodiment of the present disclosure. This embodiment is described by using an example in which the method is applied to the communications system shown in FIG. 1, and it is assumed that a change in service strength of the communications system is periodic, and the periodic change conforms to a Poisson random process. At a start moment of each duty cycle, a clustering server performs the following blocks. The duty cycle is a change period of the service strength. The method includes the following several blocks.

Block 301: Cluster base stations in a base station set managed by the clustering server, to obtain at least one cluster.

Specifically, the clustering base stations in a base station set managed by the clustering server includes: circularly performing the following blocks, until a quantity of the base stations in the base station set is zero: receiving clustering information reported by each base station in the base station set, and determining a neighboring base station set of each base station based on the clustering information, determining a base station having a highest degree as a cluster-head base station, selecting a cluster-member base station from a neighboring base station set of the base station, and enabling the cluster-head base station and the cluster-member base station as a cluster, where the degree is a quantity of neighboring base stations included in the neighboring base station set of the base station, and deleting the cluster-head base station and the cluster-member base station from the base station set.

The clustering information is a distance between the base station and another base station. The distance between the base station and the another base station is obtained by the base station from a preset information maintenance platform. Alternatively, the clustering information is an average pilot power calculated by the base station based on a pilot signal sent by another base station. The average pilot power is obtained by each base station by calculating an average value of a pilot power of a pilot signal that is sent by the another base station within a period of time.

The determining a neighboring base station set of each base station based on the clustering information includes: for each base station, using a base station with a distance that is less than a first threshold from the base station, as a neighboring base station of the base station, and forming a neighboring base station set of the base station by using at least one neighboring base station, or for each base station, using a base station that sends one or more pilot signals to the base station and that enables an average pilot power of the one or more pilot signals received by the base station to be greater than a second threshold, as a neighboring base station of the base station, and forming a neighboring base station set of the base station by using the at least one neighboring base station.

It should be noted that, when there are at least two base stations having the highest degree in the base station set, the clustering server may calculate an average distance between each base station having the highest degree and all neighboring base stations, and use a base station having a smallest average distance in the at least two base stations as a cluster-head base station, or the clustering server may calculate an average value of average pilot powers of pilot signals sent by all neighboring base stations to each base station having the highest degree, and use a base station having a largest average value as a cluster-head base station.

Example 1: It is assumed that the clustering information is a distance between the base station and another base station, and the base station set φ={base station 1, base station 2, ... , base station n}. The clustering server determines, based on distances that are between the base station 1 and the base station 2, ... , and the base station n and that are reported by the base station 1, that base stations whose distances to the base station 1 are less than the first threshold being 100 meters (m) are the base station 2, the base station 3, the base station 5, ... , and the base station m, and uses the base station 2, the base station 3, the base station 5, ... , and the base station m as neighboring base stations of the base station 1. A neighboring base station set $\Psi_1$ of the base station 1={base station 2, base station 3, base station 5, ... , base station m}. If a quantity of base stations in the neighboring base station set $\Psi_1$ of the base station 1 is 10, a degree $|\Psi_1|$ of the base station 1=10. If the degree $|\Psi_1|$ of the base station 1 is a highest degree in the base station set, the base station 1 is used as a cluster-head base station, and the clustering server selects a cluster-member base station from the neighboring base station set $\Psi_1$, uses the base station 1 and the selected cluster-member base station as a cluster, deletes the base stations in the cluster from the base station set φ, re-searches the base station set φ for a base station 0 having a highest degree, as a cluster-head base station of a next cluster, selects a cluster-member base station of the next cluster from a neighboring base station set $\Psi_0$ of the base station 0, uses the base station 0 and the selected cluster-member base station as a next cluster, and deletes the base stations in the next cluster from the base station set φ. The clustering server circularly performs the foregoing blocks, until the base station set φ is an empty set. Based on different clustering information, this embodiment provides two implementations of selecting a cluster-member base station, and the two implementations are separately described below.

In a first implementation, when the clustering information is a distance between the base station and another base station, the selecting a cluster-member base station from the neighboring base station set of the cluster-head base station includes: circularly performing the following blocks, until the quantity of base stations in the neighboring base station set of the cluster-head base station is zero: obtaining a first distance between an $i^{th}$ base station in the neighboring base station set of the cluster-head base station and the cluster-head base station, where i is a positive integer, obtaining a second distance between each base station in a neighboring base station set of the $i^{th}$ base station and the $i^{th}$ base station, and when the first distance is less than or equal to each second distance, determining the $i^{th}$ base station as a cluster-member base station, and deleting the cluster-member base station from the neighboring base station set of the cluster-head base station, or when the first distance is greater than any second distance, deleting the $i^{th}$ base station from the neighboring base station set of the cluster-head base station.

Example 2: Referring to example 1, it is assumed that the base station 1 is a cluster-head base station, the neighboring base station set $\Psi_1$ of the base station 1={base station 2, base station 3, base station 5, ... , base station m}, and a neighboring base station set $\Psi_2$ of the base station 2 in the neighboring base station set $\Psi_1$={base station 1, base station 4, base station 8, ... , base station p}. Whether that $d_{21} \leq d_{2q}$ is true is determined, where $d_{21}$ is the distance between the base station 2 and the base station 1, and $d_{2q}$ is a distance between the base station 2 and any base station in the neighboring base station set $\Psi_2$. If that $d_{21} \leq d_{2q}$ is true, the base station 2 is used as a cluster-member base station. If that $d_{21} \leq d_{2q}$ is false, the base station 2 is not used as a cluster-member base station, and the determined base station 2 is deleted from the neighboring base station set $\Psi_1$. For another base station in the neighboring base station set $\Psi_1$, the foregoing blocks are repeatedly performed, until the neighboring base station set $\Psi_1$ is an empty set.

Whether the distance between the cluster-head base station and the $i^{th}$ neighboring base station of the cluster-head base station is less than the distance between the $i^{th}$ base station and each neighboring base station of the $i^{th}$ base station is detected, so that the neighboring base station is added in priority to a cluster to which a cluster-head base station closest to the neighboring base station belongs, thereby shortening a communication distance between a cluster-head base station and a cluster-member base station in each cluster, and improving efficiency of communication between the cluster-head base station and the cluster-member base station.

In a second implementation, when the clustering information is an average pilot power calculated by the base station based on a pilot signal sent by another base station, the selecting a cluster-member base station from the neighboring base station set of the cluster-head base station includes: circularly performing the following blocks, until the quantity of base stations in the neighboring base station set of the cluster-head base station is zero: obtaining a first average pilot power of one or more pilot signals sent by an $i^{th}$ base station in the neighboring base station set of the cluster-head base station to the cluster-head base station, where i is a positive integer, obtaining a second average pilot power of one or more pilot signals sent by each base station in a neighboring base station set of the $i^{th}$ base station to the $i^{th}$ base station, and when the first average pilot power is greater than or equal to each second average pilot power, determining the $i^{th}$ base station as a cluster-member base station, and deleting the cluster-member base station from the neighboring base station set of the cluster-head base station, or when the first average pilot power is less than any second average pilot power, deleting the $i^{th}$ base station from the neighboring base station set of the cluster-head base station.

Example 3: Referring to example 1, when the clustering information is an average pilot power calculated by the base station based on a pilot signal sent by another base station, it is assumed that the base station 1 is a cluster-head base station, the neighboring base station set $\Psi_1$ of the base station 1={base station 2, base station 3, base station 5, ... , base station m}, and a neighboring base station set $\Psi_2$ of the base station 2 in the neighboring base station set $\Psi_1$={base station 1, base station 4, base station 8, ... , base station p}. Whether that $P_{21} \geq P_{2q}$ is true is determined, where $P_{21}$ is an average pilot power that is of a pilot signal sent by the base station 1 and that is calculated by the base station 2, and $P_{2q}$ is an average pilot power that is of a pilot signal sent by any base station in the neighboring base station set $\Psi_2$ and that is calculated by the base station 2. If that $P_{21} \geq P_{2q}$ is true, the base station 2 is used as a cluster-member base station. If that $P_{21} \geq P_{2q}$ is false, the base station 2 is not used as a cluster-member base station, and the determined base station 2 is deleted from the neighboring base station set $\Psi_1$. For another base station in the neighboring base station set $\Psi_1$, the foregoing blocks are repeatedly performed, until the neighboring base station set $\Psi_1$ is an empty set.

Because the average pilot power of the one or more pilot signals sent by the $i^{th}$ base station to the cluster-head base station is in positive correlation with an average pilot power of one or more pilot signals sent by the cluster-head base station to the $i^{th}$ base station, when the average pilot power of the one or more pilot signals sent by the $i^{th}$ base station to the cluster-head base station is greater than the average pilot power of the one or more pilot signals sent by each neighboring base station of the $i^{th}$ base station to the $i^{th}$ base station, the $i^{th}$ base station is used as a cluster-member base station, so that the neighboring base station is added in priority to a cluster to which a cluster-head base station having a high average pilot power belongs, thereby improving quality of a signal between a cluster-head base station and a cluster-member base station in each cluster, and improving efficiency of communication between the cluster-head base station and the cluster-member base station.

Block 302: Determine a cluster with a quantity of base stations in the cluster being 1.

When the clustering server clusters the base station set, after the cluster-head base station is determined, a cluster-member base station satisfying a condition may not be selected from the neighboring base station set of the cluster-head base station. In this case, the cluster-head base station separately forms a cluster, to be specific, a quantity of base stations in the cluster is 1.

Block 303: Determine a neighboring base station of the base station in the cluster.

For each separately clustered base station, a neighboring base station set of the separately clustered base station is determined based on the clustering information reported by each base station in block 301, and a neighboring base station closest to the separately clustered base station is determined in the neighboring base station set, or a neighboring base station that sends one or more pilot signals to the separately clustered base station and that enables an average pilot power of the one or more pilot signals received by the separately clustered base station to be the highest is determined.

Block 304: Add, when the neighboring base station is a cluster-head base station, the base station as a cluster-member base station to a cluster to which the neighboring base station belongs.

When the neighboring base station closest to the separately clustered base station is a cluster-head base station, or when the neighboring base station that sends the one or more pilot signals to the separately clustered base station and that enables the average pilot power of the one or more pilot signals received by the separately clustered base station to be the highest is a cluster-head base station, the separately clustered base station as a cluster-member base station is added to a cluster to which the neighboring base station belongs.

When the neighboring base station closest to the separately clustered base station is not a cluster-head base station, or when the neighboring base station that sends the one or more pilots signal to the separately clustered base station and that enables the average pilot power of the one or more pilot signals received by the separately clustered base station to be the highest is not a cluster-head base station, the neighboring base station is deleted from the neighboring base station set of the separately clustered base station, the block of determining a neighboring base station closest to the separately clustered base station, or determining a neighboring base station that sends a pilot signal to the separately clustered base station and that enables an average pilot power of the one or more pilot signals received by the separately clustered base station to be the highest in block 303 is performed again, until a quantity of neighboring base station sets of the separately clustered base station is zero, or until the separately clustered base station as a cluster-member base station is added to a cluster to which the neighboring base station belongs.

Optionally, when there are at least two separately clustered base stations, a separately clustered base station having a highest degree may be clustered in priority again, to be specific, block 303 and block 304 are performed in priority for the separately clustered base station having the highest degree. Because there are a large quantity of neighboring base stations of the base station having the highest degree, a probability that there is a cluster-head base station in the neighboring base stations is high, and a success rate of clustering the base station again is high.

After the base station as a cluster-member base station is added to the cluster to which the neighboring base station belongs, for each cluster, a cluster-head identity and an address of each cluster-member base station are sent to a cluster-head base station in the cluster, and the cluster-head base station sends an address of the cluster-head base station and a cluster-member identity to each cluster-member base station, or for each cluster, a cluster-head identity and an address of each cluster-member base station are sent to a cluster-head base station in the cluster, and a cluster-member identity and an address of the cluster-head base station are sent to each cluster-member base station.

An identity of the cluster-head base station may be a particular cluster-head identifier, for example, 1-bit information that is a character 1, and an identity of the cluster-member base station may be a particular cluster-member identifier, for example, 1-bit information that is a character 0. During actual implementation, the identity of the cluster-head base station and the identity of the cluster-member base station may alternatively be indicated by using information of another value of bits. This is not limited in this embodiment. The address of the cluster-head base station may be an identity (ID) of the cluster-head base station, and the address of the cluster-member base station may be an identity of the cluster-member base station.

In conclusion, according to the base station clustering method provided in this embodiment of the present disclosure, a separately clustered base station obtained through clustering is clustered again, so that the separately clustered base station can be added to another cluster, and a cluster-head base station in the another cluster can control a working status of the base station, thereby resolving a problem that the clustering server cannot control the working status of the separate base station when clustering the base station set, and energy consumption of the base station cannot be reduced, and reducing the energy consumption of the separately clustered base station.

In addition, when the clustering information is a distance between the base station and another base station, and when the distance between the cluster-head base station and the $i^{th}$ neighboring base station of the cluster-head base station is less than the distance between the $i^{th}$ base station and each neighboring base station of the $i^{th}$ base station, the $i^{th}$ base station is used as a cluster-member base station, so that the neighboring base station is added in priority to a cluster to which a cluster-head base station closest to the neighboring base station belongs, thereby shortening a communication distance between a cluster-head base station and a cluster-member base station in each cluster, and improving efficiency of communication between the cluster-head base station and the cluster-member base station. When the clustering information is an average pilot power calculated by the base station based on a pilot signal sent by another base station, because the average pilot power of the one or more pilot signals sent by the $i^{th}$ base station to the cluster-head base station is in positive correlation with an average pilot power of one or more pilot signals sent by the cluster-head base station to the $i^{th}$ base station, when the average pilot power of the one or more pilot signals sent by the $i^{th}$ base station to the cluster-head base station is greater than the average pilot power of the one or more pilot signals sent by each neighboring base station of the $i^{th}$ base station to the $i^{th}$ base station, the $i^{th}$ base station is used as a cluster-member base station, so that the neighboring base station is added in priority to a cluster to which a cluster-head base station having a strong average received pilot signal belongs, thereby improving quality of a signal between a cluster-head base station and a cluster-member base station in each cluster, and improving efficiency of communication between the cluster-head base station and the cluster-member base station.

In addition, when a neighboring base station closest to the separately clustered base station is a cluster-head base station, the base station as a cluster-member base station is added to a cluster to which the neighboring base station belongs, so that the working status of the base station can be controlled by using the neighboring base station, and a problem of low communication efficiency caused by an excessively long communication distance between the base station and the cluster-head base station can be avoided when the base station is added to another cluster, thereby improving efficiency of communication between the separately clustered base station and the cluster-head base station.

In addition, when a neighboring base station that sends one or more pilot signals to the separately clustered base station and that enables an average pilot power of the one or more pilot signals received by the separately clustered base station to be the highest is a cluster-head base station, the base station as a cluster-member base station is added to a cluster to which the neighboring base station belongs, so that the working status of the base station can be controlled by using the neighboring base station, and a problem of low communication efficiency caused by excessively poor quality of the pilot signal between the base station and the cluster-head base station can be avoided when the base station is added to another cluster, thereby improving efficiency of communication between the separately clustered base station and the cluster-head base station.

Figure 4:
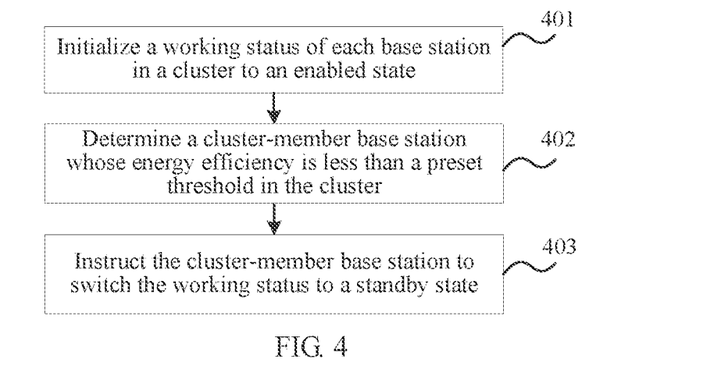
FIG. 4 is a method flowchart of a base station control method according to an embodiment of the present disclosure.

FIG. 4 is a flowchart of a base station control method according to an example of an embodiment of the present disclosure. This embodiment is described by using an example in which the method is applied to the communications system shown in FIG. 1, and a cluster-head base station obtained by performing clustering according to the embodiment shown in FIG. 3 performs the following blocks. The method includes the following several blocks.

Block 401: Initialize a working status of each base station in a cluster to an enabled state.

The cluster-head base station divides each duty cycle, to obtain at least two time periods. Lengths of the at least two time periods may be the same or may be different. This is not limited in this embodiment.

At a start moment of each time period, the cluster-head base station sets the working status of each base station in the cluster to the enabled state. The enabled state is a state in which the base station enables a communications service. Specifically, for each base station in the cluster, when a working status in a previous time period is a standby state, at a start moment of a current time period, the working status is switched to the enabled state, or when a working status in a previous time period is the enabled state, at a start moment of a current time period, the working status is maintained. The standby state is a state in which the base station disables the communications service.

Block 402: Determine a cluster-member base station whose energy efficiency is lower than a preset threshold in the cluster.

There may be no cluster-member base station in a cluster to which the cluster-head base station belongs, to be specific, the cluster-head base station is a separately clustered base station. In this case, if the cluster-head base station determines the cluster-member base station whose energy efficiency is lower than the preset threshold, a running resource of the cluster-head base station is wasted. Therefore, in this embodiment, before determining the cluster-member base station whose energy efficiency is lower than the preset threshold in the cluster, the cluster-head base station detects whether a quantity of cluster-member base stations in the cluster to which the cluster-head base station belongs is zero, and if the quantity of cluster-member base stations is not zero, determines the cluster-member base station whose energy efficiency is lower than the preset threshold in the cluster.

Energy efficiency of each cluster-member base station is calculated by the cluster-head base station based on a total user rate and a power of the cluster-member base station that are reported by the cluster-member base station.

Specifically, energy efficiency $\eta_k$ of a $k^{th}$ $$\text{cluster-member base station} = \sum_{m \in M_k} R_m^k / P_{total}^k,$$

where $M_k$ indicates a set of user equipments accessing the $k^{th}$ cluster-member base station, $R_m^k$ indicates a user rate of $m^{th}$ user equipment in $M_k$, and $P_{total}^k$ indicates power consumption of the $k^{th}$ cluster-member base station. Specific algorithms of $R_m^k$ and $P_{total}^k$ are the same as those in the prior art, and details are not described herein.

When the quantity of cluster-member base stations is zero, the cluster-head base station detects whether a quantity of user equipments accessing the cluster-head base station is zero. If the quantity of user equipments is not zero, the working status of the cluster-head base station being the enabled state is maintained. If the quantity of user equipments is zero, it indicates that the cluster-head base station provides a communications service to no user equipment. If the quantity of user equipments is zero, in an implementation, the cluster-head base station may directly switch the working status of the cluster-head base station to the standby state, to reduce energy consumption of the cluster-head base station, in another implementation, the cluster-head base station detects whether an access request sent by user equipment is received within preset duration, and if the access request is received within the preset duration, the working status of the cluster-head base station being the enabled state is maintained, or if the access request is not received within the preset duration, it indicates that a probability that user equipment accesses the cluster-head base station within the current time period is low, and in this case, the working status of the cluster-head base station is switched to the standby state, thereby lowering a probability that the cluster-head base station whose working status is switched to the standby state cannot provide a communications service to subsequently accessing user equipment.

Block 403: Instruct the cluster-member base station to switch the working status to a standby state.

Correspondingly, the cluster-member base station switches the working status to the standby state under control of the cluster-head base station.

In a first implementation, after determining the cluster-member base station whose energy efficiency is lower than the preset threshold, the cluster-head base station directly instructs the cluster-member base station to switch the working status to the standby state. In this case, if user equipment accessing the cluster-member base station fails to be transferred to at least one base station in the cluster, a communications service is interrupted. That the user equipment fails to be transferred to the at least one base station in the cluster means that all resource blocks (RBs) of each of the at least one base station are occupied, or a user rate of the user equipment transferred to the at least one base station is lower than a minimum rate threshold.

In a second implementation, the cluster-head base station instructs the cluster-member base station to transfer, to at least one base station in the cluster, all user equipments accessing the cluster-member base station, where energy efficiency of each of the at least one base station is higher than the energy efficiency of the cluster-member base station, and after all the user equipments accessing the cluster-member base station are successfully transferred, instructs the cluster-member base station to switch the working status to the standby state. In this case, after all the user equipments accessing the cluster-member base station whose energy efficiency is lower than the preset threshold are successfully transferred, the cluster-head base station instructs the cluster-member base station to switch the working status to the standby state, thereby ensuring that a communications service for these user equipments is not interrupted.

The instructing, by the cluster-head base station, the cluster-member base station to transfer all user equipments accessing the cluster-member base station to at least one base station in the cluster, where energy efficiency of each of the at least one base station is higher than the energy efficiency of the cluster-member base station includes determining, based on the energy efficiency calculation formula described in block 402, a base station having highest energy efficiency in the cluster, or determining a base station having best channel quality in the cluster, or determining a base station having highest energy efficiency and best quality in the cluster, and transferring, to the at least one determined base station, all the user equipments accessing the cluster-member base station.

It may be reversely deduced from the energy efficiency calculation formula that, a large quantity of user equipments access the base station having the highest energy efficiency, and all the user equipments accessing the cluster-member base station are transferred to the at least one base station having the highest energy efficiency, so that the at least one base station can more centrally manage the user equipments, thereby improving resource utilization of the base station.

The determining that all the user equipments accessing the cluster-member base station are successfully transferred includes: determining, by the cluster-head base station, whether the at least one base station to be transferred to has an RB that is not occupied.

For each base station to be transferred to, if there is an RB that is not occupied, the base station to be transferred to is instructed to allocate, to user equipment having a smallest user rate in the user equipments accessing the cluster-member base station, an RB having a highest channel gain in the RB that is not occupied, the user rate of the user equipment calculated by the base station to be transferred to is re-obtained, whether the user rate is greater than or equal to the minimum rate threshold is determined, and if the user rate is greater than or equal to the minimum rate threshold, it is determined that the user equipment is successfully transferred to the base station, or if the user rate is less than the minimum rate threshold, the RB is deleted from the RB that is not occupied, and the base station to be transferred to is re-instructed to allocate, to the user equipment, an RB having a highest channel gain in an updated RB that is not occupied, until the base station has no RB that is not occupied, or until the user equipment is successfully transferred to the base station.

If there is no RB that is not occupied, the cluster-head base station deletes, from the base stations whose working statuses are the enabled state in the cluster, the base station having the highest energy efficiency, selects, from updated base stations whose working statuses are the enabled state, a base station having highest energy efficiency, and for remaining user equipment that is not successfully transferred, continues to perform the block of determining whether the base station has an RB that is not occupied, until it is determined that all the user equipments are successfully transferred to the at least one base station to be transferred to, or until it is determined that any user equipment fails to be transferred to each base station to be transferred to.

In a third implementation, before the cluster-head base station instructs the cluster-member base station to transfer, to the base station in the cluster, all the user equipments accessing the cluster-member base station, first total energy efficiency of all the base stations in the cluster is calculated, after the cluster-head base station instructs the cluster-member base station to transfer, to the base station in the cluster, all the user equipments accessing the cluster-member base station, the cluster-member base station transfers, to the base station in the cluster, all the user equipments accessing the cluster-member base station, where the energy efficiency of the base station is higher than energy efficiency of the cluster-member base station, second total energy efficiency of one or more other base stations in the cluster is calculated, where the one or more other base stations are base stations other than the cluster-member base station from which the user equipment is transferred in the cluster, and when the second total energy efficiency is higher than or equal to the first total energy efficiency, it indicates that after all the user equipments accessing the cluster-member base station are transferred, total energy efficiency of the base station in the cluster is improved, and the cluster-member base station is instructed to switch the working status to the standby state. In this case, when all the user equipments accessing the cluster-member base station whose energy efficiency is lower than the preset threshold are successfully transferred, and the total energy efficiency in the cluster after the transferring is improved, the cluster-head base station instructs the cluster-member base station to switch the working status to the standby state, thereby ensuring that a communications service for these user equipments is not interrupted, and improving the total energy efficiency of the base station in the cluster.

Specifically, the first total energy efficiency of all the base stations is as follows:

$$\eta_{total} = \sum_{k=1}^{K} \sum_{m \in M_k} R_m^k \bigg/ \sum_{k=1}^{K} P_{total}^k,$$

where K is a total quantity of base stations in the cluster, $M_k$ indicates the set of user equipments accessing the $k^{th}$ cluster-member base station, $R_m^k$ indicates the user rate of the $m^{th}$ user equipment in $M_k$, and $P_{total}^k$ indicates the power consumption of the $k^{th}$ cluster-member base station.

The second total energy efficiency of the one or more other base stations is as follows:

$$\eta'_{total} = \sum_{k=1}^{K-1} \sum_{m \in M_k} R_m^k \bigg/ \sum_{k=1}^{K-1} P_{total}^k,$$

where K−1 is a total quantity of all base stations other than the cluster-member base station from which the user equipment is transferred in the cluster.

In conclusion, according to the base station control method provided in this embodiment of the present disclosure, the cluster-member base station whose energy efficiency is lower than the preset threshold in the clustered is instructed to switch the working status to the standby state, so that the cluster-head base station can determine, without needing to be equipped with a sniffer, whether the cluster-member base station needs to be instructed to switch the working status to the standby state, thereby resolving a problem of an excessively complex structure of the cluster-head base station caused by that the cluster-head base station needs to configure the sniffer to detect an uplink signal of the cluster-member base station, and determines, based on signal strength of the uplink signal, whether the cluster-member base station needs to be instructed to switch the working status to the standby state, and simplifying the structure of the cluster-head base station.

In addition, whether the quantity of user equipments accessing the cluster-head base station is zero is detected, and when the quantity of user equipments is zero, the working status of the cluster-head base station is switched to the standby state, so that a working status of a separately clustered base station can be switched based on a quantity of user equipments accessing the separately clustered base station, thereby reducing energy consumption of the separately clustered base station.

In addition, the cluster-member base station is instructed to transfer, to the at least one base station in the cluster, all the user equipments accessing the cluster-member base station, where the energy efficiency of each of the at least one base station is higher than the energy efficiency of the cluster-member base station, and after all the user equipments accessing the cluster-member base station are successfully transferred, the cluster-member base station is instructed to switch the working status to the standby state, so that after all the user equipments accessing the cluster-member base station whose energy efficiency is lower than the preset threshold are successfully transferred, the cluster-head base station instructs the cluster-member base station to switch the working status to the standby state, thereby avoiding a problem of an interruption of the communications service for these user equipments caused by that the cluster-member base station is instructed to switch the working status to the standby state when these user equipments fail to be transferred to a base station in another cluster, and ensuring that the communications service for these user equipments is not interrupted.

In addition, the first total energy efficiency of all the base stations in the cluster is calculated, all the user equipments accessing the cluster-member base station are transferred to the base station in the cluster, where the energy efficiency of the base station is higher than the energy efficiency of the cluster-member base station, the second total energy efficiency of the one or more other base stations in the cluster is calculated, where the one or more other base stations are base stations other than the cluster-member base station from which the user equipment is transferred in the cluster, and when the second total energy efficiency is higher than or equal to the first total energy efficiency, the cluster-member base station is instructed to switch the working status to the standby state, so that when all the user equipments accessing the cluster-member base station whose energy efficiency is lower than the preset threshold are successfully transferred, and the total energy efficiency in the cluster after the transferring is improved, the cluster-head base station instructs the cluster-member base station to switch the working status to the standby state, thereby ensuring that the communications service for these user equipments is not interrupted, and improving the total energy efficiency of the base station in the cluster.

Figure 5:
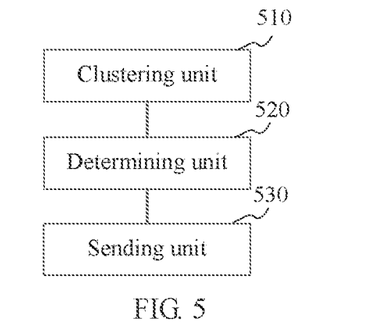
FIG. 5 is a block diagram of a base station clustering apparatus according to an embodiment of the present disclosure.

FIG. 5 is a block diagram of a base station clustering apparatus according to an embodiment of the present disclosure. The base station clustering apparatus may be implemented as all or a part of a clustering server through software, hardware, or a combination of the two. The base station clustering apparatus may include a clustering unit 510, a determining unit 520, and a sending unit 530.

The clustering unit 510 is configured to implement the foregoing functions in block 301 and block 304.

The determining unit 520 is configured to implement the foregoing functions in block 302 and block 303.

The sending unit 530 is configured to implement the foregoing function in block 304: for each cluster, sending a cluster-head identity and an address of each cluster-member base station to a cluster-head base station in the cluster, and sending, by the cluster-head base station, an address of the cluster-head base station and a cluster-member identity to each cluster-member base station, or for each cluster, sending a cluster-head identity and an address of each cluster-member base station to a cluster-head base station in the cluster, and sending a cluster-member identity and an address of the cluster-head base station to each cluster-member base station.

For related details, refer to the method embodiment in FIG. 3.

It should be noted that, the clustering unit 510 and the determining unit 520 may be implemented by a processor in the clustering server, and the sending unit 530 may determine a sending occasion by using the processor in the clustering server, and may be implemented by a transceiver in the clustering server.

Figure 6:
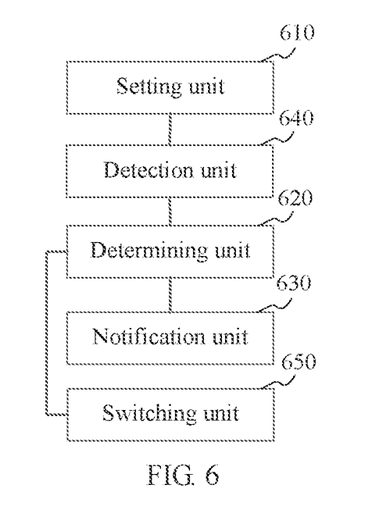
FIG. 6 is a block diagram of a base station control apparatus according to an embodiment of the present disclosure.

FIG. 6 is a block diagram of a base station control apparatus according to an embodiment of the present disclosure. The base station control apparatus may be implemented as all or a part of a cluster-head base station through software, hardware, or a combination of the two. The base station control apparatus may include a setting unit 610, a determining unit 620, a notification unit 630, a detection unit 640, and a switching unit 650.

The setting unit 610 is configured to implement the foregoing function in block 401.

The determining unit 620 is configured to implement the foregoing function in block 402.

The notification unit 630 is configured to implement the foregoing function in block 403.

The detection unit 640 is configured to implement the foregoing function in block 402: detecting whether a quantity of cluster-member base stations in a cluster to which the cluster-head base station belongs is zero, when the quantity of cluster-member base stations is zero, detecting whether a quantity of user equipments accessing the cluster-head base station is zero, and if the quantity of user equipments is zero, detecting whether an access request sent by user equipment is received within preset duration.

The switching unit 650 is configured to implement the foregoing function in block 401: if the access request is not received within the preset duration, switching the working status of the cluster-head base station to the standby state.

For related details, refer to the method embodiment in FIG. 4.

It should be noted that, the setting unit 610, the determining unit 620, the detection unit 640, and the switching unit 650 may be implemented by a processor in the cluster-head base station, and the notification unit 630 may determine a notification occasion by using the processor in the cluster-head base station, and may be implemented by a transceiver in the cluster-head base station.

A person of ordinary skill in the art may be aware that, in combination with the examples described in the embodiments disclosed in this specification, units and algorithm blocks may be implemented by electronic hardware or a combination of computer software and electronic hardware. Whether the functions are performed by hardware or software depends on particular applications and design constraint conditions of the technical solutions.

It may be clearly understood by a person of ordinary skill in the art that, for ease and brief description, for a detailed working process of the foregoing apparatus and module, refer to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division may merely be logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:

clustering, by a clustering server, base stations in a base station set managed by the clustering server, to obtain at least one cluster, each of the at least one cluster comprising a cluster-head base station configured for controlling one or more cluster-member base stations of a respective cluster;

determining, by the clustering server, a first cluster in the at least one cluster with a quantity of base stations in the first cluster being 1, the first cluster comprising a first base station;

determining, by the clustering server, a first neighboring base station of the first base station, the first neighboring base station belonging to a second cluster of the at least one cluster, wherein the first neighboring base station has a distance that is less than a first threshold from the first base station, or the first neighboring base station is configured to send one or more pilot signals to the first base station with an average pilot power of the one or more pilot signals received by the first base station greater than a second threshold; and adding, by the clustering server, when the first neighboring base station is a cluster-head base station of the second cluster, the first base station as a first cluster-member base station to the second cluster such that the first base station is re-clustered into the second cluster.

2. The method according to claim 1, wherein clustering, by the clustering server, the base stations in the base station set managed by the clustering server, to obtain the at least one cluster comprises:

iteratively performing following steps, until the base station set comprises no base station:

receiving clustering information reported by each base station in the base station set, and determining a neighboring base station set of each base station in the base station set based on the clustering information, wherein the neighboring base station set of a respective base station in the base station set comprises at least one neighboring base station of the respective base station, and the clustering information of the respective base station comprises a distance between the respective base station and another base station, or the clustering information of the respective base station comprises an average pilot power calculated by the respective base station based on one or more pilot signals sent by another base station;

determining, from the base station set, a base station having a highest degree as a first cluster-head base station, selecting a cluster-member base station from the neighboring base station set of the first cluster-head base station, and forming a cluster using the first cluster-head base station and the cluster-member base station, wherein a degree of the respective base station is a quantity of neighboring base stations comprised in the neighboring base station set of the respective base station; and deleting the first cluster-head base station and the cluster-member base station from the base station set.

3. The method according to claim 2, wherein when the clustering information of the respective base station comprises the distance between the respective base station and another base station, selecting, by the clustering server, the cluster-member base station from the neighboring base station set of the first cluster-head base station comprises:

iteratively performing following steps, until a quantity of base stations in the neighboring base station set of the first cluster-head base station is zero:

obtaining a first distance between an $i^{th}$ base station in the neighboring base station set of the first cluster-head base station and the first cluster-head base station, wherein i is a positive integer;

obtaining a second distance between each base station in a neighboring base station set of the $i^{th}$ base station and the $i^{th}$ base station; and when the first distance is less than or equal to each second distance, determining the $i^{th}$ base station as the cluster-member base station, and deleting the cluster-member base station from the neighboring base station set of the first cluster-head base station; or when the first distance is greater than any second distance, deleting the $i^{th}$ base station from the neighboring base station set of the first cluster-head base station.

4. The method according to claim 2, wherein when the clustering information of the respective base station comprises the average pilot power calculated by the respective base station based on the one or more pilot signals sent by another base station, selecting, by the clustering server, the cluster-member base station from the neighboring base station set of the first cluster-head base station comprises:

iteratively performing following steps, until a quantity of base stations in the neighboring base station set of the first cluster-head base station is zero:

obtaining a first average pilot power of one or more pilot signals sent by an $i^{th}$ base station in the neighboring base station set of the first cluster-head base station to the first cluster-head base station, wherein i is a positive integer;

obtaining a second average pilot power of one or more pilot signals sent by each base station in the neighboring base station set of the $i^{th}$ base station to the $i^{th}$ base station; and performing at least one of:

when the first average pilot power is greater than or equal to each second average pilot power, determining the $i^{th}$ base station as the cluster-member base station, and deleting the cluster-member base station from the neighboring base station set of the first cluster-head base station; or when the first average pilot power is less than any second average pilot power, deleting the $i^{th}$ base station from the neighboring base station set of the first cluster-head base station.

5. The method according to claim 1, wherein determining, by the clustering server, the first neighboring base station of the first base station comprises:

receiving clustering information reported by each base station in the base station set, and determining a neighboring base station set of each base station based on the clustering information, wherein the neighboring base station set of a respective base station in the base station set comprises at least one neighboring base station of the respective base station; and determining, in the neighboring base station set of the first base station, the first neighboring base station that is closest to the first base station; or determining, in the neighboring base station set of the first base station, the first neighboring base station that sends the one or more pilot signals to the first base station with the average pilot power of the one or more pilot signals received by the first base station being the highest in the neighboring base station set of the first base station; and wherein adding, by the clustering server, when the first neighboring base station is the cluster-head base station, the first base station as the first cluster-member base station to the second cluster comprises:

when the first neighboring base station closest to the first base station is the cluster-head base station, or when the first neighboring base station, which sends the one or more pilot signals to the first base station with the average pilot power of the one or more pilot signals received by the first base station being the highest, is the cluster-head base station, adding the first base station as the first cluster-member base station to the second cluster.

6. The method according to claim 1, further comprising:

sending, for each cluster of the at least one cluster, a cluster-head identity and an address of each cluster-member base station of the respective cluster to a cluster-head base station of the respective cluster, for the cluster-head base station of the respective cluster to send an address of the cluster-head base station of the respective cluster and a cluster-member identity to each cluster-member base station of the respective cluster; or sending, for each cluster of the at least one cluster, a cluster-head identity and an address of each cluster-member base station of the respective cluster to a cluster-head base station of the respective cluster, and sending a cluster-member identity and an address of the cluster-head base station of the respective cluster to each cluster-member base station of the respective cluster.

7. The method according to claim 1, further comprising:

initializing, by the cluster-head base station of the second cluster via the clustering server, a working status of each base station of the second cluster to an enabled state, wherein the enabled state is a state in which a communications service is enabled;

determining, by the cluster-head base station via the clustering server, a cluster-member base station in the second cluster whose energy efficiency is lower than a preset threshold; and instructing, by the cluster-head base station via the clustering server, the cluster-member base station to switch the working status of the cluster-member base station from the enabled state to a standby state, wherein the standby state is a state in which the communications service is disabled.

8. The method according to claim 7, wherein instructing, by the cluster-head base station via the clustering server, the cluster-member base station to switch the working status of the cluster-member base station from the enabled state to the standby state comprises:

instructing the cluster-member base station to transfer, to at least one base station in the second cluster, user equipments accessing the cluster-member base station, wherein energy efficiency of each of the at least one base station is higher than the energy efficiency of the cluster-member base station; and after the user equipments accessing the cluster-member base station are successfully transferred to the at least one base station, instructing the cluster-member base station to switch the working status from the enabled state to the standby state.

9. A clustering server, wherein the clustering server comprises:

a processor; and a transceiver connected to the processor;
wherein the processor is configured to cluster base stations in a base station set managed by the clustering server, to obtain at least one cluster, each of the at least one cluster comprising a cluster-head base station configured for controlling one or more cluster-member base stations of a respective cluster;
wherein the processor is configured to determine a first cluster in the at least one cluster with a quantity of base stations in the first cluster being 1, the first cluster comprising a first base station;
wherein the processor is configured to determine a first neighboring base station of the first base station, the first neighboring base station belonging to a second cluster of the at least one cluster, wherein the first neighboring base station has a distance that is less than a first threshold from the first base station, or the first neighboring base station is configured to send one or more pilot signals to the first base station with an average pilot power of the one or more pilot signals received by the first base station greater than a second threshold; and
wherein the processor is configured to add, when the first neighboring base station is a cluster-head base station of the second cluster, the first base station as a first cluster-member base station to the second cluster.

10. The clustering server according to claim 9, wherein the processor is further configured to:
iteratively perform, until a quantity of the base stations in the base station set is zero, following steps of:
receiving, by using the transceiver, clustering information reported by each base station in the base station set, and determining a neighboring base station set of each base station in the base station set based on the clustering information, wherein the neighboring base station set of a respective base station in the base station set comprises at least one neighboring base station of the respective base station, and the clustering information of the respective base station comprises a distance between the respective base station and another base station, or the clustering information of the respective base station comprises an average pilot power calculated by the respective base station based on a pilot signal sent by another base station;
determining, from the base station set, a base station having a highest degree as a first cluster-head base station, selecting a cluster-member base station from the neighboring base station set of the first cluster-head base station, and forming a cluster using the cluster-head base station and the cluster-member base station, wherein a degree of the respective base station is a quantity of neighboring base stations comprised in the neighboring base station set of the respective base station; and
deleting the first cluster-head base station and the cluster-member base station from the base station set.

11. The clustering server according to claim 10, wherein the processor is further configured to, when the clustering information of the respective base station comprises the distance between the respective base station and another base station:
iteratively perform following steps, until a quantity of base stations in the neighboring base station set of the first cluster-head base station is zero:
obtaining a first distance between an $i^{th}$ base station in the neighboring base station set of the first cluster-head base station and the first cluster-head base station, wherein i is a positive integer;
obtaining a second distance between each base station in a neighboring base station set of the $i^{th}$ base station and the $i^{th}$ base station; and
performing at least one of:
when the first distance is less than or equal to each second distance, determining the $i^{th}$ base station as the cluster-member base station, and deleting the cluster-member base station from the neighboring base station set of the first cluster-head base station; or
when the first distance is greater than any second distance, deleting the $i^{th}$ base station from the neighboring base station set of the first cluster-head base station.

12. The clustering server according to claim 10, wherein the processor is further configured to, when the clustering information of the respective base station comprises the average pilot power calculated by the respective base station based on the one or more pilot signals sent by another base station:
iteratively perform following steps, until the quantity of base stations in the neighboring base station set of the cluster-head base station is zero:
obtaining a first average pilot power of one or more pilot signals sent by an $i^{th}$ base station in the neighboring base station set of the first cluster-head base station to the first cluster-head base station, wherein i is a positive integer;
obtaining a second average pilot power of one or more pilot signals sent by each base station in a neighboring base station set of the $i^{th}$ base station to the $i^{th}$ base station; and
performing at least one of:
when the first average pilot power is greater than or equal to each second average pilot power, determining the $i^{th}$ base station as the cluster-member base station, and deleting the cluster-member base station from the neighboring base station set of the first cluster-head base station; or
when the first average pilot power is less than any second average pilot power, deleting the $i^{th}$ base station from the neighboring base station set of the first cluster-head base station.

13. The clustering server according to claim 9, wherein the processor is further configured to:
receive, by using the transceiver, clustering information reported by each base station in the base station set, and determine a neighboring base station set of each base station based on the clustering information, wherein the neighboring base station set of a respective base station in the base station set comprises at least one neighboring base station of the respective base station;
determine, in the neighboring base station set of the first base station, the first neighboring base station that is closest to the first base station; or determine, in the neighboring base station set of the first base station, the first neighboring base station that sends the one or more pilot signals to the first base station with the average pilot power of the one or more pilot signals received by the first base station being the highest in the neighboring base station set of the first base station; and
when the first neighboring base station closest to the first base station is the cluster-head base station, or when the first neighboring base station, which sends the one or more pilot signals to the first base station with the average pilot power of the one or more pilot signals received by the first base station being the highest, is the cluster-head base station, add the first base station as the first cluster-member base station to the second cluster.

14. The clustering server according to claim 9, wherein the transceiver is configured to:
send, for each cluster of the at least one cluster, a cluster-head identity and an address of each cluster-member base station of the respective cluster to a cluster-head base station of the respective cluster, for the cluster-head base station of the respective cluster to send an address of the cluster-head base station of the respective cluster and a cluster-member identity to each cluster-member base station of the respective cluster; or
after the first base station as the first cluster-member base station is added to the second cluster when the first neighboring base station is the cluster-head base station, for each cluster of the at least one cluster, send a cluster-head identity and an address of each cluster-member base station of the respective cluster to a cluster-head base station of the respective cluster, and send a cluster-member identity and an address of the cluster-head base station of the respective cluster to each cluster-member base station of the respective cluster.

15. A non-transitory processor-readable medium having a program to be executed by a processor, the program including instructions for:
clustering base stations in a base station set managed by a clustering server, to obtain at least one cluster, each of the at least one cluster comprising a cluster-head base station configured for controlling one or more cluster-member base stations of a respective cluster;
determining a first cluster from the at least one cluster with a quantity of base stations in the first cluster being 1, the first cluster comprising a first base station;
determining a first neighboring base station of the first base station, the first neighboring base station belonging to a second cluster of the at least one cluster, wherein the first neighboring base station has a distance that is less than a first threshold from the first base station, or the first neighboring base station is configured to one or more pilot signal s to the first base station with an average pilot power of the one or more pilot signals received by the first base station greater than a second threshold; and
adding, when the first neighboring base station is a cluster-head base station of the second cluster, the first base station as a first cluster-member base station to the second cluster such that the first base station is re-clustered into the second cluster.

16. The non-transitory processor-readable medium according to claim 15, wherein the instructions for clustering the base stations in the base station set managed by the clustering server, to obtain the at least one cluster include instructions for:
iteratively performing, until a quantity of the base stations in the base station set is zero, instructions for:
receiving clustering information reported by each base station in the base station set, and determining a neighboring base station set of each base station in the base station set based on the clustering information, wherein the neighboring base station set of a respective base station in the base station set comprises at least one neighboring base station of the respective base station, and the clustering information of the respective base station comprises a distance between the respective base station and another base station, or the clustering information of the respective base station comprises an average pilot power calculated by the respective base station based on one or more pilot signals sent by another base station;
determining, from the base station set, a base station having a highest degree as a first cluster-head base station, selecting a cluster-member base station from the neighboring base station set of the first cluster-head base station, and forming a cluster using the cluster-head base station and the cluster-member base station, wherein a degree of the respective base station is a quantity of neighboring base stations comprised in the neighboring base station set of the base station; and
deleting the first cluster-head base station and the cluster-member base station from the base station set.

17. The non-transitory processor-readable medium according to claim 16, wherein the instructions for selecting the cluster-member base station from the neighboring base station set of the first cluster-head base station comprise instruction for, when the clustering information of the respective base station comprises the distance between the respective base station and another base station:
iteratively performing, until a quantity of base stations in the neighboring base station set of the first cluster-head base station is zero, instructions for:
obtaining a first distance between an $i^{th}$ base station in the neighboring base station set of the first cluster-head base station and the first cluster-head base station, wherein i is a positive integer;
obtaining a second distance between each base station in a neighboring base station set of the $i^{th}$ base station and the $i^{th}$ base station; and
performing at least one of:
when the first distance is less than or equal to each second distance, determining the $i^{th}$ base station as the cluster-member base station, and deleting the cluster-member base station from the neighboring base station set of the first cluster-head base station; or
when the first distance is greater than any second distance, deleting the $i^{th}$ base station from the neighboring base station set of the first cluster-head base station.

18. The non-transitory processor-readable medium according to claim 16, wherein the instructions for selecting the cluster-member base station from the neighboring base station set of the first cluster-head base station include instructions for, when the clustering information of the respective base station comprises the average pilot power calculated by the respective base station based on the one or more pilot signals sent by another base station:
iteratively performing, until a quantity of base stations in the neighboring base station set of the first cluster-head base station is zero, instructions for:
obtaining a first average pilot power of one or more pilot signals sent by an $i^{th}$ base station in the neighboring base station set of the first cluster-head base station to the first cluster-head base station, wherein i is a positive integer;

obtaining a second average pilot power of one or more pilot signals sent by each base station in the neighboring base station set of the $i^{th}$ base station to the $i^{th}$ base station; and performing at least one of:
   when the first average pilot power is greater than or equal to each second average pilot power, determining the $i^{th}$ base station as the cluster-member base station, and deleting the cluster-member base station from the neighboring base station set of the first cluster-head base station; or
   when the first average pilot power is less than any second average pilot power, deleting the $i^{th}$ base station from the neighboring base station set of the first cluster-head base station.

19. The non-transitory processor-readable medium according to claim 15, wherein the instructions for determining the first neighboring base station of the first base station include instructions for:
   receiving clustering information reported by each base station in the base station set, and determining a neighboring base station set of each base station based on the clustering information, wherein the neighboring base station set of a respective base station in the base station set comprises at least one neighboring base station of the respective base station; and
   determining, in the neighboring base station set of the first base station, the first neighboring base station that closest to the base station; or determining, in the neighboring base station set of the first base station, the first neighboring base station that sends the one or more pilot signals to the first base station with the average pilot power of the one or more pilot signals received by the first base station being the highest in the neighboring base station set of the first base station; and wherein the instructions for adding, when the first neighboring base station is the cluster-head base station, the first base station as the first cluster-member base station to the second cluster include instructions for:
   when the first neighboring base station closest to the first base station is the cluster-head base station, or when the first neighboring base station, which sends the one or more pilot signals to the base station and that enables the average pilot power of the one or more pilot signals received by the first base station being the highest, is the cluster-head base station, adding the first base station as the first cluster-member base station to the second cluster.

20. The non-transitory processor-readable medium according to claim 15, wherein the program further includes instructions for performing at least one of:
   sending, for each cluster of the at least one cluster, a cluster-head identity and an address of each cluster-member base station of the respective cluster to a cluster-head base station of the respective cluster, for cluster-head base station of the respective cluster to send an address of the cluster-head base station of the respective cluster and a cluster-member identity to each cluster-member base station of the respective cluster; or
   sending, for each cluster of the at least one cluster, a cluster-head identity and an address of each cluster-member base station of the respective cluster to a cluster-head base station of the respective cluster, and send a cluster-member identity and an address of the cluster-head base station of the respective cluster to each cluster-member base station of the respective cluster.

* * * * *